United States Patent
Roberts et al.

(10) Patent No.: US 6,792,283 B1
(45) Date of Patent: Sep. 14, 2004

(54) METHOD OF SELECTING CELLS IN A CELLULAR MOBILE RADIO SYSTEM

(75) Inventors: Michael Roberts, Neuilly sur Seine (FR); François Courau, Meudon (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/245,333

(22) Filed: Feb. 5, 1999

(30) Foreign Application Priority Data

Feb. 6, 1998 (FR) .............................................. 98 01442

(51) Int. Cl.[7] .............................. H04Q 7/20; H04B 7/00
(52) U.S. Cl. ...................... 455/525; 455/438; 455/439; 455/443; 455/426.1; 455/435.2
(58) Field of Search .................................. 455/436, 437, 455/438, 433, 426, 432–444, 525, 524; 370/331

(56) References Cited

U.S. PATENT DOCUMENTS

| | | | | |
|---|---|---|---|---|
| 5,287,545 A | * | 2/1994 | Kallin ......................... | 455/422 |
| 5,475,689 A | * | 12/1995 | Kay et al. ................... | 370/337 |
| 5,862,480 A | * | 1/1999 | Wild et al. .................. | 455/432 |
| 5,862,490 A | * | 1/1999 | Sasuta et al. ............... | 455/525 |
| 5,903,832 A | * | 5/1999 | Seppanen et al. ........... | 455/414 |
| 6,011,971 A | * | 1/2000 | Jolma ......................... | 455/438 |
| 6,026,291 A | * | 2/2000 | Carlsson et al. ............ | 455/406 |
| 6,038,445 A | * | 3/2000 | Alperovich et al. ........ | 455/422 |
| 6,041,235 A | * | 3/2000 | Aalto ......................... | 455/437 |
| 6,081,713 A | * | 6/2000 | Desgagne ................... | 455/436 |
| 6,101,383 A | * | 8/2000 | Poon .......................... | 455/425 |
| 6,119,003 A | * | 9/2000 | Kukkohovi ................. | 455/435 |
| 6,119,021 A | * | 9/2000 | Katz .......................... | 455/561 |
| 6,134,443 A | * | 10/2000 | Spann et al. ................ | 455/450 |
| 6,377,804 B1 | * | 4/2002 | Lintulampi ................. | 455/435 |

FOREIGN PATENT DOCUMENTS

| | | | |
|---|---|---|---|
| EP | 0 785 696 A2 | 7/1997 | |
| EP | 0 808 073 A2 | 11/1997 | |
| WO | WO 96/28947 | * 9/1996 | ............ H04Q/7/38 |
| WO | WO 97/44922 | 11/1997 | |
| WO | WO9744922 | * 11/1997 | |

* cited by examiner

*Primary Examiner*—Duc M. Nguyen
(74) *Attorney, Agent, or Firm*—Sughrue Mion, PLLC

(57) ABSTRACT

A cellular mobile radio network selects a cell when a mobile station accesses the network, if a different cell than initially accessed by the mobile station is better suited to provide the types of services required by the mobile station, and is available. If a better cell is selected, the network initiates a hand over of the mobile station to the selected cell.

27 Claims, 3 Drawing Sheets

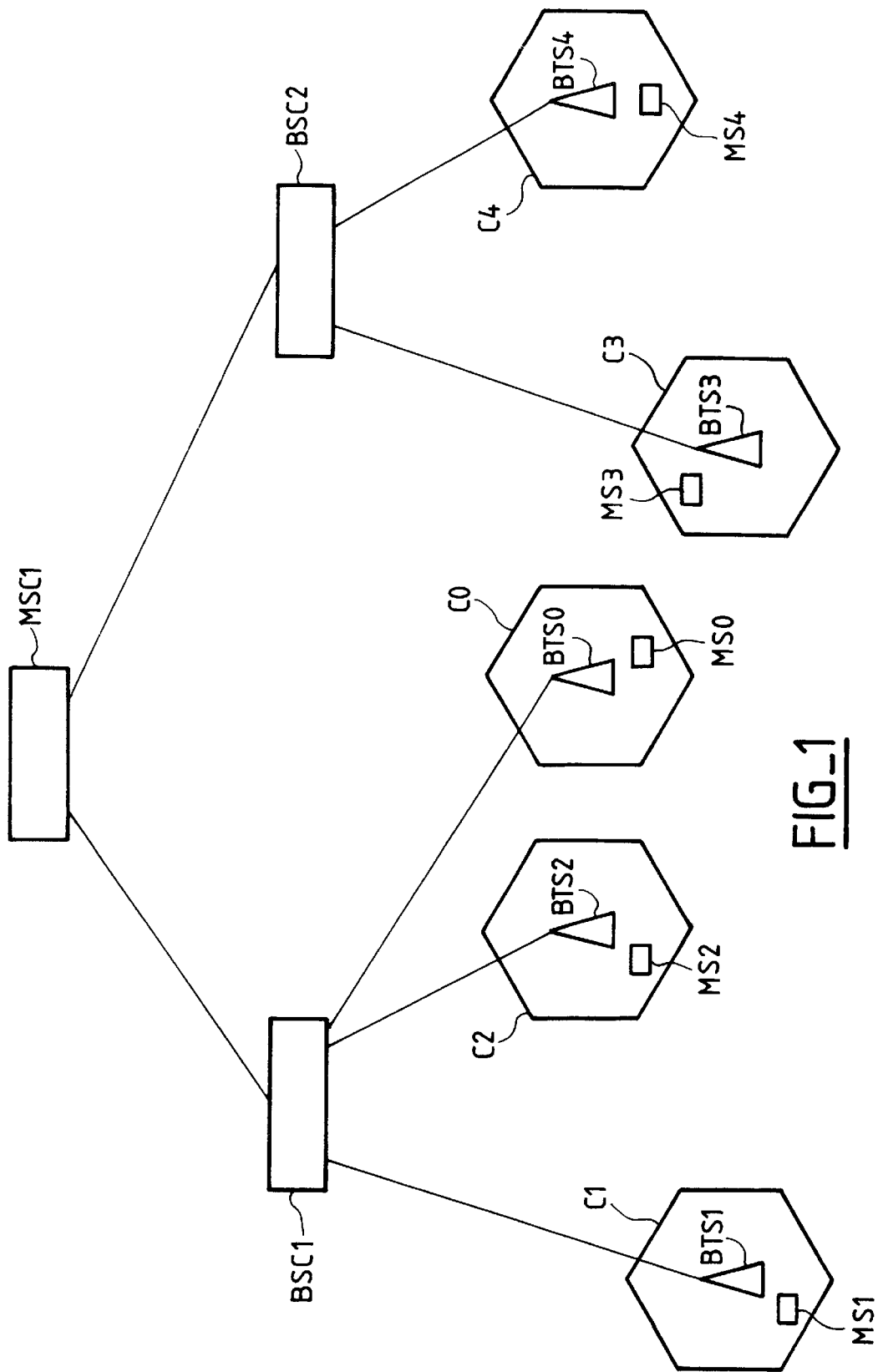
FIG_1

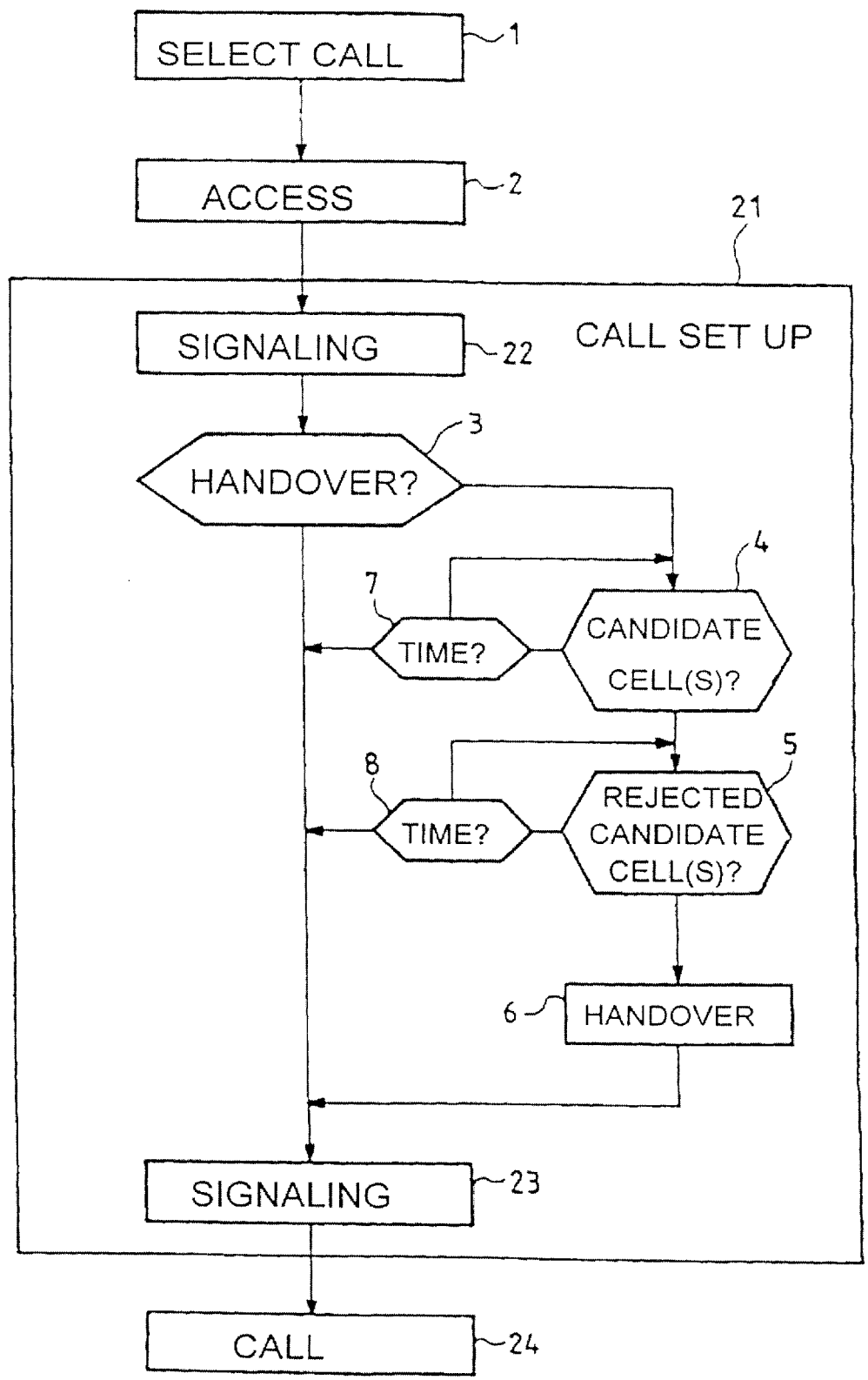

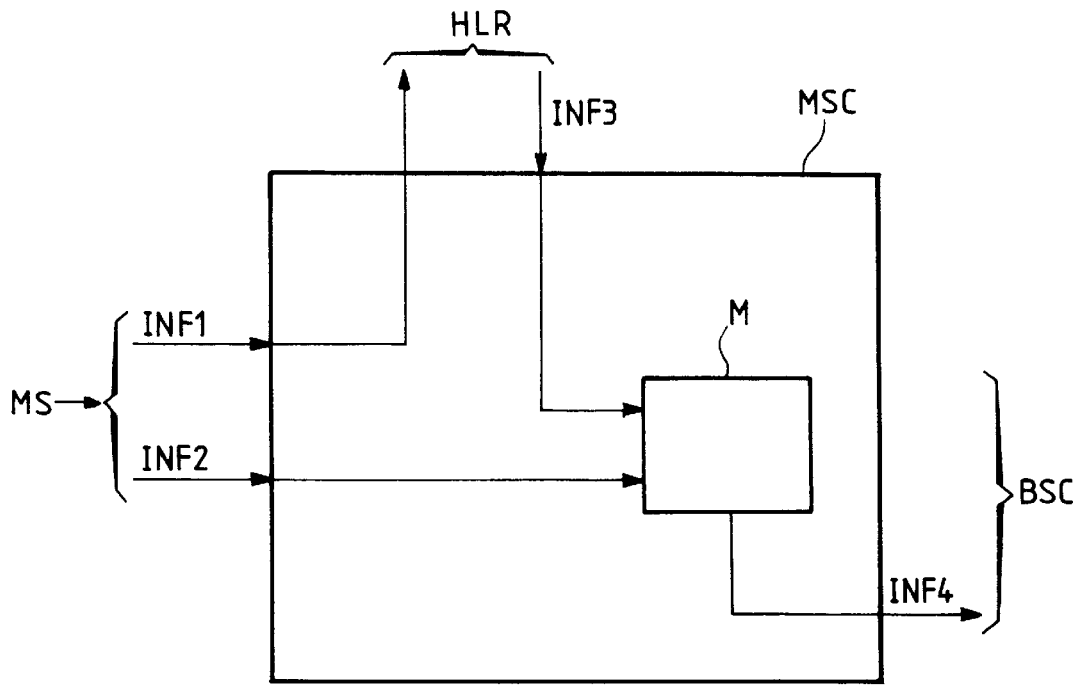
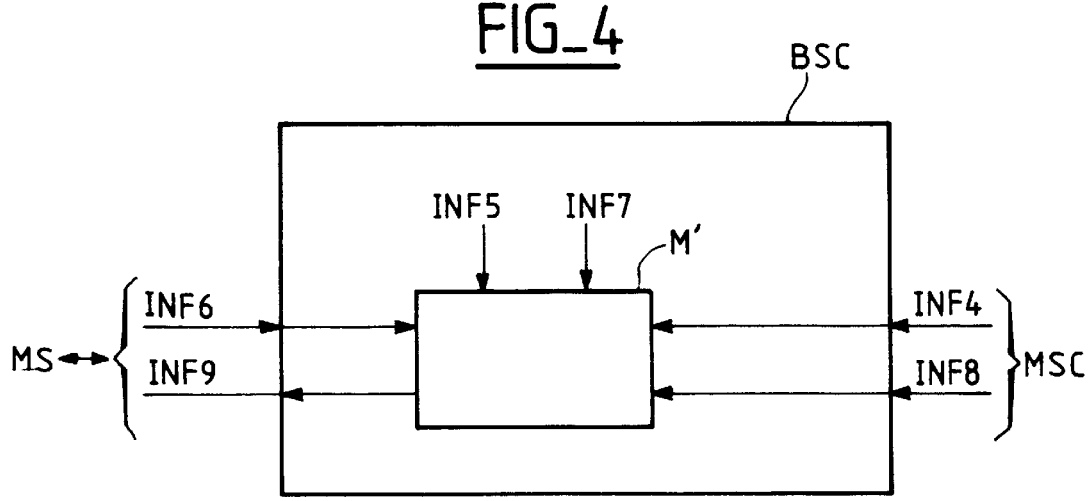

METHOD OF SELECTING CELLS IN A CELLULAR MOBILE RADIO SYSTEM

The present invention is generally concerned with cellular mobile radio systems, i.e. cellular mobile radio networks and mobile stations for use in such networks.

The present invention is more particularly concerned with selecting a cell when a mobile station accesses a network of the above kind to make a call.

BACKGROUND OF THE INVENTION

The mobile station itself selecting a cell for access to the network is known per se, the corresponding algorithm used in the mobile station being known as a cell selection algorithm.

To be more precise the network broadcasts in the server cell, on a particular broadcast control channel, information needed to execute an algorithm of the above kind and including a list of neighboring cells for the mobile station to monitor to determine whether the signal level received on the broadcast control channel from the neighboring cells or from the server cell is more favorable. Providing that certain other criteria are satisfied, the cell determined in this way is selected for access to the network. What is more, when the mobile station is first put into service, at which time no server cell has been selected, the mobile station scans all the broadcast control channels and determines the server cell using the same criteria.

For a more complete description of cellular mobile radio systems such as the Global System for Mobile communications (GSM) see "The GSM System for Mobile Communications" by M. MOULY and M. B. PAUTHET (Palaiseau, France, 1992, ISBN:2-9507190-7-7).

The present invention is even more particularly concerned with cell selection during access to a cellular mobile radio network for making a call when the network includes different types of cell in which different types of service are available.

One example of a network of the above kind is a network in which new means of radio access to that infrastructure, corresponding to a system such as a third generation system (in particular the Universal Mobile Telecommunication System (UMTS)), are successively introduced into an existing infrastructure corresponding to a system such as a second generation system (in particular the previously mentioned GSM) in order to introduce new services progressively, in particular high bit rate data transmission services.

A system of the above kind thus includes cells or resources in which new services are available, in this instance UMTS cells or GSM/UMTS cells (i.e. cells having a broadcast control channel common to GSM type radio access means and to UMTS type radio access means), and cells in which said new services are not available, in this instance GSM cells.

In a system of the above kind the cell selection algorithm mentioned above may select a GSM cell although the service required for a given call for which the mobile station is accessing the network would require a UMTS or GSM/UMTS cell, or conversely it may select a UMTS or GSM/UMTS cell although a GSM cell would suffice for the service required, with the result that in neither case is radio resource allocation optimized to suit the services required by users in a network of the above kind.

Another example of a network of the above kind is a network in which additional radio access means dedicated to a particular user group and enabling those users to obtain additional services in a given geographical area are introduced into an existing infrastructure corresponding to a given system, for example the GSM, and that geographical area.

In a system of the above kind the cell selection algorithm previously mentioned may select a cell in which said additional services are not available, in particular if a user authorized to use the additional services is at the limit of the geographical area, in which case neither the user nor the provider of the services is satisfied.

Thus the problem of the cell selected for access to the network not necessarily corresponding to a better cell in terms of services generally arises in a cellular mobile radio system including different types of cells in which different types of services are available.

In a cellular mobile radio network such as the GSM network, selecting a cell during a call to determine a better cell to which the call is to be handed over is known per se. Having the network select the cell on the basis of measurement results transmitted to it by the mobile station is also known per se. To be more precise, the cell selected is the first from a list of candidate cells listed in an order of preference according to the measurement results and to which handover is possible, i.e. in particular in which resources are available for the call.

In a cellular mobile radio network such as the GSM network "directed retry", i.e. handover from a cell initially selected for access to the network to a better cell selected subsequently, is known per se, and in this case it may be necessary to allow for the fact that the cell is selected differently in the two situations, as just outlined, which can lead to different cells being selected.

Document WO97/44922 describes a cellular mobile radio system including different types of cells in which different types of multimedia service are available and in which a best cell to which to hand over a call in progress is selected on the basis of measurement results for candidate cells, the availability of resources in those candidate cells and the type of service requested. However, the above document does not cover cell selection on accessing the network to make a call. Also, the above document describes a mobile station provided with means enabling it to select the best cell to which to hand over a call in progress. If such cell selection were implemented in the mobile station to select a cell when accessing the network to make a call, this would have the drawback of necessitating many exchanges of signaling between the mobile station and the network, leading to high consumption of radio resources for such exchanges, and thus to an increase in the overall level of interference in the network. The present invention also aims to avoid these drawbacks.

OBJECTS AND SUMMARY OF THE INVENTION

Thus in particular the invention aims to enable access by a mobile station a cellular mobile radio network including different types of cell in which different types of service are available in a way that avoids the various drawbacks mentioned above.

The present invention therefore consists in a method of selecting a cell when a mobile station accesses a cellular mobile radio network to make a call, said network including different types of cells in which different types of services are available, said method including the following steps:

selection by said mobile station of a cell to access the network, access to the network in the cell so selected, corresponding to a given type of cell, and deciding whether or not to hand over said call to a cell of another type constituting a better cell in terms of services, depending on the type of service required for said call.

In other words, the invention can be considered as introducing a new application of the "directed retry" concept whereby a call is handed over from a cell initially selected for access to the network to another cell constituting a better cell in terms of service.

The present invention also consists in a cellular mobile radio network enabling the use of a method of the above kind (the present invention having the advantage of not requiring any modification of the mobile stations to enable it to be implemented).

BRIEF DESCRIPTION OF THE DRAWINGS

Other objects and features of the present invention will appear on reading the following description of one embodiment of the invention given with reference to the accompanying drawings, in which:

FIG. 1 is a diagram intended to illustrate one example of a system to which the present invention can be applied, FIG. 2 is a diagram intended to illustrate the various steps of one example of the method of the invention, and FIGS. 3 and 4 are diagrams intended to illustrate one example of means to be provided in a network to which the present invention can be applied to enable use of the method in accordance with the invention.

MORE DETAILED DESCRIPTION

As shown in FIG. 1, a cellular mobile radio system essentially comprises:

a set of base transceiver stations (BTS), such as those designated BTS0, BTS1, BTS2, BTS3 and BTS4, each base transceiver station being allocated to one cell, respectively designated C0, C1, C2, C3 and C4, and the base transceiver stations communicating via a radio interface with mobile stations, such as stations MSO, MS1, MS2, MS3, MS4, in the example shown, a set of base station controllers (BSC), such as those designated BSC1 and BSC2, each BSC controlling a subset of cells from the radio resource management point of view, base station controller BSC1 controlling cells C0, C1 and C2 and base station controller BSC2 controlling cells C3 and C4 in the example shown, a set of mobile switching centers (MSC), of which only one, designated MSC1, is shown in the figure, each MSC being connected in a manner that is not specifically shown to external networks including the Public Switched Telephone Network (PSTN) or the Integrated Services Digital Network (ISDN) and controlling a subset of base station controllers from the call management point of view, mobile switching center MSC1 controlling base station controllers BSC1 and BSC2 in the example shown.

The combination of the BTS and BSC, known as a Base Station Subsystem (BSS), constitutes what is referred to above as network radio access means.

By way of example, to which the present invention applies, the radio access means formed of the elements BTS3, BTS4 and BSC2 constitute new radio access means, corresponding to the UMTS system, introduced into an existing infrastructure corresponding to the GSM system and already having its own radio access means, formed of the elements BTSO, BTS1, BTS2 and BSC1. Cells such as cells C0, C1 and C2 then constitute a first type of cell, corresponding to GSM cells, and cells such as cells C3 and C4 constitute a second type of cell, corresponding to UMTS or GSM/UMTS cells. The mobile stations concerned are dual mode mobile stations able to communicate via either of the radio interfaces corresponding to these different radio access means.

FIG. 2 shows the various steps of one example of the method of the present invention.

FIG. 2 shows the following steps:

selection by a mobile station of a cell used to access the network, for example using the cell selection algorithm mentioned above (step 1, "Select cell"), access to the network for a given call in the cell so selected, corresponding to a given type of cell (step 2, "Access), a call set up phase (step 21, "Call set up") comprising, in addition to steps of exchanging signaling needed for call set up (such as steps 22 and 23, "Signaling"), deciding whether or not to hand over the call to a cell of another type constituting a better cell in terms of service (step 3, "Handover?"), and a call phase in the cell so selected (step 24, "Call"), or at least the beginning of a call phase, one or more handovers possibly being effected afterwards, during the call.

If the decision taken in step 3 is not to hand over, the cell initially selected to access the network continues to be the selected cell.

If the decision taken in step 3 is to hand over, subsequent steps are executed to determine to which of the cells of said other type the call is to be handed over, which steps can be similar to those usually employed to select a better cell to which to hand over a call in progress, except that here they do not apply to cells of any type, but only to cells of said other type:

a step to determine whether candidate cells of said other type can be identified (step 4, "Candidate cell(s)?"), a step to determine if handover to one or other of the candidate cells, considered in a particular order of preference, is possible, i.e. if this is not a rejected cell (step 5, "Rejected candidate cell(s)?").

If a non-rejected candidate cell is determined, handover to that cell is commanded (step 6, "Handover").

If a candidate cell, or a non-rejected candidate cell, cannot be found, handover can be attempted subsequently, preferably within particular time limits (steps 7 and 8, "Time?"). If no handover to a better cell in terms of service is possible, the call is left in the cell initially selected for access to the network. In the case considered here of a combined GSM/UMTS network, for example, the network can then provide a lower grade of service, in particular a data transmission service at a lower bit rate, or any other substitute service, until handover to a better cell in terms of service subsequently becomes possible, as the result of the user moving around or changes in radio and traffic conditions within the network during the call.

Note that in another example the cells identified as candidate cells could be cells of any type and the candidate cells to which handover is attempted could be only cells of said other type.

In the example shown in FIG. 1, if cells C0, C1 and C2 are GSM cells, access to the network by a mobile station such as station MSO, for example, for a call corresponding, for example, to a high bit rate data transmission service available in a UMTS or GSM/UMTS cell like cells C3 and C4, for example, can be effected in the following manner:

selection of a GSM cell, for example cell C0, by mobile station MS0, access to the network in cell C0 so selected, and in accordance with signaling data transmitted by the mobile station during the call set up phase, decision to hand over the call to a UMTS or GSM/UMTS cell; in the example shown this could be cell C3, for example.

FIGS. 3 and 4 are diagrams intended to illustrate one example of means to be provided in the network, respectively in the MSC and BSC entities, to enable use of a method in accordance with the invention.

As shown in FIG. 3, a MSC receives from a mobile station MS, on accessing the network and during the call set up phase:

information INF1 identifying the user, and information INF2 identifying the type of service required for the call in question.

An MSC also receives, from a database such as the Home Location Register (HLR) and in response to the information INF1, information INF3 identifying the services that the user is authorized to use and possibly geographical limits on such use.

The MSC shown in FIG. 3 further includes means M for determining from information INF2 and INF3 information INF4 indicating the type of cell constituting a better cell in terms of service for that user and for that call.

For example, in the case considered here of a mixed GSM/UMTS network a better cell in terms of services could be a UMTS or GSM/UMTS cell when the service required is a high bit rate data transmission service available only in a UMTS or GSM/UMTS cell, as already mentioned, or a GSM cell in the converse situation.

As shown in FIG. 4, means M' are provided in the entity BSC:

on the one hand, to decide if handover to a better cell in terms of service must be effected or not, this decision being taken on the basis of:

the type of cell selected for access to the network, represented by information INF5 that can be supplied by the BSC concerned (i.e. the BSC controlling the current server cell, in this instance the cell selected to access the network), the type of cell constituting a better cell in terms of service, represented by the information INF4, on the other hand, if it is decided that handover must be effected, selecting the cell to which the handover is to be effected on the basis of:

information such as INF6 corresponding to measurement results supplied by the mobile station MS, information on the availability of resources in the candidate cells concerned, such as information INF7 supplied by radio resource management means within the BSC concerned (in the case of internal or intra-BSC handover) or information INF8 supplied by the MSC that controls this BSC (in the case of external or inter-BSC handover), information relating to the type of cell constituting a better cell in terms of service, such as information INF4.

The means M' operate essentially in accordance with the method as previously described to determine, from information such as INF4 through INF8, whether handover to a better cell in terms of service is to be effected, and if so to select the cell to which handover is to be effected, the cell so selected being indicated by information such as INF9 transmitted to the mobile station MS.

The particular implementation of the means M and M' to have the system operate in accordance with the method described will be evident to the skilled person and does not need to be specifically described. Also, the division of the various functions between the MSC and BSC entities can be other than as described above by way of example.

What is more, the transmission of information such as INF1 through INF9 within the network can use protocols for communication within a network that are known per se and do not need to be described here.

The example described optimizes allocation of radio resources within the network in accordance with services required by users.

In this application example, the invention is not limited to the situation in which the cell initially selected to access the network is a GSM cell and handover is then effected to a UMTS or GSM/UMTS cell. It can also be used when the cell initially selected to access the network is a UMTS or GSM/UMTS cell and handover is then effected to a GSM cell (if that is allowed for the service required), so further optimizing allocation of radio resources within the network.

Further, as already indicated, the invention is not limited to the application example described corresponding to a mixed GSM/UMTS network.

What is claimed is:

1. A method of selecting a cell when a mobile station initially accesses a cellular mobile radio network to make a call, said network including different types of cells in which different types of services are available, said different types of services being a function of radio access techniques available in said different types of cells, said method including the following steps:

selecting, by the mobile station, a cell to initially access the network, accessing the network in the cell so selected, corresponding to a given type of cell, and deciding, in the network when the mobile station initially accesses the network, whether or not to hand over said call to a cell of another type constituting a better cell in terms of types of services, depending on the type of service required for said call at the time of said initial selection.

2. The method of selecting a cell as recited in claim 1, wherein said step of deciding whether or not to hand over is performed by the network.

3. The method of selecting a cell as recited in claim 2, further comprising:

signaling to the mobile station which cell is selected for hand over, if said network decides to hand over said call to a cell of another type.

4. The method of selecting a cell as recited in claim 1, further comprising:

identifying, by the network, types of services that a user of said mobile station is authorized to use.

5. The method of selecting a cell as recited in claim 4, wherein said step of identifying further includes identifying geographical limits on the user's authority to use respective types of services.

6. The method of selecting a cell as recited in claim 1, wherein a first radio access technique corresponds to a GSM system and a second radio access technique corresponds to a UMTS system.

7. The method of selecting a cell as recited in claim 1, wherein the types of service available in a second system corresponding to a second radio access technique include all of the types of service available in a first system corresponding to a first radio access technique.

8. A cellular mobile radio network including different types of cells in which different types of services are available, said different types of services being a function of radio access techniques available in said different types of cells, the network including, for selecting a cell when a mobile station accesses the network to set up a call:
- means for determining, when the mobile station initially accesses the network to set up a call, a type of cell constituting a better cell, in terms of types of services, according to the type of service required for said call, and
- means for deciding if said call is to be handed over from a cell initially selected for access to the network to a cell of said type of cell constituting the better cell in terms of types of services.

9. The cellular radio network of claim 8, wherein said means for determining the type of call constituting a better cell accesses a database to identify types of services that a user of said mobile station is authorized to use.

10. The cellular radio network of claim 9, wherein said means for determining the type of call constituting a better cell also identifies, from the database, geographical limits on the user's authority to use respective types of services.

11. A network equipment for a cellular mobile radio network including different types of cells in which different types of services are available, said different types of services being a function of radio access techniques available in said different types of cells, the network equipment including, for selecting a cell when a mobile station accesses the network to set up a call:
- means for determining, when the mobile station accesses the network to set up a call, a type of cell constituting a better cell, in terms of types of services, according to the type of service required for said call.

12. The network equipment of claim 11, wherein said means for determining the type of call constituting a better cell accesses a database to identify types of services that a user of said mobile station is authorized to use.

13. The network equipment of claim 12, wherein said means for determining the type of call constituting a better cell also identifies, from the database, geographical limits on the user's authority to use respective types of services.

14. A network-equipment for a cellular mobile radio network including different types of cells in which different types of services are available, said different types of services being a function of radio access techniques available in said different types of cells, the network equipment including, for selecting a cell when a mobile station accesses the network to set up a call:
- means for deciding, when the mobile station initially accesses the network to set up a call, if said call is to be handed over from a cell initially selected for access to the network to a cell of a type of cell constituting a better cell in terms of types of services.

15. The network equipment of claim 14, further comprising:
- means for determining the type of cell constituting a better cell, in terms types of services available, according to the type of service required for said call.

16. The network equipment of claim 15, wherein said means for determining the type of call constituting a better cell accesses a database to identify types of services that a user of said mobile station is authorized to use.

17. The network equipment of claim 16, wherein said means for determining the type of call constituting a better cell also identifies, from the database, geographical limits on the user's authority to use respective types of services.

18. A cellular mobile radio network including different types of cells in which different types of services are available, said different types of services being a function of radio access techniques in said different types of cells, the network comprising:
- at least one mobile switching center, receiving from a mobile station, upon said mobile station accessing said network and during a set-up phase of a call, information identifying a user of said mobile station and information identifying a type of service required by said mobile station for said call, wherein said at least one mobile switching center is operative during the set-up phase of the call to determine a type of cell constituting a better cell in terms types of services, according to the type of service required by said mobile station, for said call; and
- at least one base station controller, receiving information identifying said type of cell constituting the better cell from said at least one mobile switching center, wherein said at least on base station controller is operative to determine if said call is to be handed over from a cell initially selected for access to the network to a cell of said type of cell constituting the better cell in terms of types of services.

19. The cellular radio network of claim 18, wherein said at least one mobile switching center is further operative to access a database to identify types of services that said user of said mobile station is authorized to use, and
- wherein said at least one mobile switching center limits the types of services available to said user to those services for which said user is authorized.

20. The cellular radio network of claim 19, wherein said at least one mobile switching center is further operative to identify, from the database, geographical limits on the authority of said user to use respective types of services, and
- wherein said at least one mobile switching center limits the types of services available to said user based on a location of said mobile station and in accordance with said geographical limits.

21. A method of a mobile station accessing a cellular mobile radio network to make a call, said network having a plurality of cells including at least first and second different types of cells in which different types of services are available, said different types of services being a function of radio access techniques available in said different types of cells, said method including the steps of:
- said mobile station initially accessing the network in a first one of said plurality of cells;
- determining, in the network when the mobile station initially accesses the network, if said first cell provides the type of service required by said mobile station at the time of initial access; and
- handing said call over to a different type of cell in response to said determining step.

22. A cellular communications system, comprising:
- a mobile station, which selects a first cell of a network and which establishes access to said network through said first cell; and
- said network, which includes different types of cells in which different types of services are available, said different types of services being a function of radio access techniques available in said different types of cells, said network comprising:
  - at least one mobile switching center, receiving from said mobile station, upon said mobile station accessing said network through said first cell and during a set-up phase of a call, information identifying a user of said mobile station and information identifying a type of service required by said mobile station for said call, wherein said at least one mobile switching center is operative during said set-up phase of the call to determine a type of cell constituting a better cell in terms of types of services, according to the type of service required by said mobile station, for said call; and at least one base station controller, receiving information identifying said type of cell constituting the better cell from said at least one mobile switching center, wherein said at least on base station controller is operative to determine if said call is to be handed over from said first cell initially selected for access to the network to a second cell of said type of cell constituting the better cell in terms of types of services.

23. The cellular communications system according to claim 22, further comprising:

a database, which stores information that identifies types of services that said user of said mobile station is authorized to use, wherein said at least one mobile switching center is further operative to access said database to identify types of services that said user of said mobile station is authorized to use, and wherein said at least one mobile switching center limits the types of services available to said user to those services for which said user is authorized.

24. The cellular communications system according to claim 23, wherein said database further stores geographical limits on the authority of said user to use respective types of services;

wherein said at least one mobile switching center is further operative to identify, from said database, geographical limits on the authority of said user to use respective types of services; and wherein said at least one mobile switching center limits the types of services available to said user based on a location of said mobile station and in accordance with said geographical limits.

25. A cellular communications system, including a mobile station and a network of different types of cells in which different types of services are available, said different types of services being a function of radio access techniques available in said different types of cells, comprising:

means for selecting a first cell of a network for access to the network;

means for accessing the network with the mobile station via the first cell;

means for setting up a call after the mobile station access the network via the first cell;

means for determining, during the setting up of the call, a type of cell constituting a better cell in terms of types of services, according to the type of service required for the call; and means for deciding if the call is to be handed over from the first cell initially selected for accessing the network to a second cell of the type of cell constituting the better cell in terms of types of services.

26. A cellular communications system according to claim 25, further comprising:

means for identifying types of services that a user of the mobile station is authorized to use; and means for limiting the types of services available to the user to those services which said means for identifying types of services that a user of the mobile station is authorized to use indicates the user is authorized to use.

27. A cellular communications system according to claim 25, further comprising:

means for identifying geographical limits on an authority of a user of the mobile station to use respective types of services;

means for identifying a location of the mobile station; and means for limiting the types of services available to the user based on the location of the mobile station, as provided by said means for identifying a location of the mobile station, and in accordance with said geographical limits, as provided by said means for identifying geographical limits on an authority of a user of the mobile station to use respective types of services.

* * * * *